United States Patent [19]

Baltes

[11] 3,870,807

[45] Mar. 11, 1975

[54] PROCESS FOR MANUFACTURE OF EDIBLE, FLOWABLE SUSPENSIONS OR SOLID GLYCERIDES IN LIQUID GLYCERIDES OR MIXTURES OF LIQUID AND SOLID GLYCERIDES AND PRODUCTS OBTAINED THEREBY

[75] Inventor: Josef Baltes, Sendenhorst, Germany

[73] Assignee: Harburger, Oelwerke, Brinckman & Mergell, Hamburg, Germany

[22] Filed: Aug. 18, 1971

[21] Appl. No.: 172,926

[30] Foreign Application Priority Data

Aug. 31, 1970 Germany.............................. 2043084

[52] U.S. Cl................. 426/194, 426/362, 426/417, 426/189, 260/409, 260/410.7
[51] Int. Cl........ A23d 5/02, A23d 3/02, C11c 3/10
[58] Field of Search........ 260/409, 410.7; 99/122 R, 99/122 M, 118 F, 118 R; 426/417, 194, 148, 362, 189

[56] References Cited
UNITED STATES PATENTS

| | | | |
|---|---|---|---|
| 2,442,531 | 6/1948 | Eckey | 260/410.7 |
| 2,442,539 | 6/1948 | Eckey | 260/410.7 |
| 2,627,467 | 2/1953 | Gooding | 99/144 |
| 2,875,066 | 2/1959 | Holman et al. | 260/410.7 X |
| 3,369,909 | 2/1968 | Schroeder et al. | 426/417 |
| 3,394,014 | 7/1968 | Simmons | 99/118 |
| 3,459,777 | 8/1969 | Seiden | 260/409 |

*Primary Examiner*—Lewis Gotts
*Assistant Examiner*—Diana G. Rivers
*Attorney, Agent, or Firm*—Cushman, Darby & Cushman

[57] ABSTRACT

Edible, liquid, cold-stable glycerides are prepared by (a) hydrogenating soya oil with a nickel catalyst at 110° to 150°C. to an iodine number of 90 to 115, (b) controllably transesterifying the soya oil at 25° to 30°C. with a transesterification catalyst to produce higher melting glycerides, (c) fractionating the material from (b) by slowly cooling it to 0° to 10°C. and keeping it there for 2–20 hours and then separating the solids from the liquid, or (d) mixing the material from (b) in equal proportions with the cold stable oil prepared in (c) and cooling to 10° to 18°C. to crystallize out high melting triglycerides and then keeping the mixture at 25°C. until the solids are converted into the stable crystal form and then cooling or (e) converting the material from (b) optionally after admixing with solids obtained from (c) into margerine.

13 Claims, No Drawings

PROCESS FOR MANUFACTURE OF EDIBLE, FLOWABLE SUSPENSIONS OR SOLID GLYCERIDES IN LIQUID GLYCERIDES OR MIXTURES OF LIQUID AND SOLID GLYCERIDES AND PRODUCTS OBTAINED THEREBY

The present invention relates to a process for the simultaneous or alternative manufacture of edible liquid, cold-stable glycerides, of edible flowable suspensions of solid glycerides in liquid glycerides, and of mixtures of solid and liquid glycerides, suitable for use in the manufacture of margarine, from soya oil.

It is known that soya oil will only keep for a limited period and has a marked tendency to change its flavour, the so-called flavour reversion. This property is principally attributable to the presence of linolenic acid, which is sensitive to oxidation and which usually accounts for 6 – 9% of the total fatty acids of the oil. In addition, there are present 40 to 50% of linoleic acid, which is less sensitive to oxidative influences, and 20 to 25% of oleic acid and 10 to 15% of saturated fatty acids. For this reason, it has hitherto not been possible to use soya oil for the manufacture of edible oils (salad oils), margarine and other fatty products if the quality requirements are high, especially the keeping properties.

Numerous attempts have been made to improve the keeping properties and hence the general possibilities of using soya oil, by lowering the proportion of linolenic acid. The obvious way of achieving this is partial and selective fat hardening. However, inadequate results are obtained with the customary nickel contact catalysts, using the process conditions which are usually employed when harding fat. Such nickel contact catalysts only have a relatively low selectivity $S_{32} = 2 - 3$, by which is meant the ratio of the reaction velocity constants $k_3$ to $k_2$ in the simplified hydrogenation reaction scheme linolenic acid $\xrightarrow{k_3}$ linoleic acid $\xrightarrow{k_2}$ oleic acid $\xrightarrow{k_1}$ saturated acids. Furthermore, the hydrogenation is accompanied to a considerable extent by spatial isomerisation processes, so that 25 to 50% of the double bonds remaining in the hardened products are in the trans-form and hence the proportion of fatty acids which are solid at ordinary temperature is additionally increased. Somewhat more favourable results are obtained by using highly active nickel contact catalysts, which permit the hardening process to be carried out at lower temperatures, say at 110° to 150°C, and a higher hydrogen pressure, say 3 to 4 kg/cm². Freshly prepared supported contact catalysts with 20 to 25 parts by weight of nickel and 75 to 80 parts by weight of gamma-aluminum oxide have been found suitable. If the hardening process conducted under these conditions is stopped at an iodine number of 95 to 115, it is found that the proportion of linolenic acid in the hardened product has dropped to about 20% or below and the proportion of doubly unsaturated fatty acids has dropped to about 60% of the original values. The extent of spatial isomerisation is also relatively low and does not account for more than about 20% of trans double bonds which remain in the hardened product. Nevertheless, however, the proportion of glycerides which are solid at low temperatures is still quite considerable and these can only be separated off with great difficulty. These solid glycerides are compounds of mixed acid type, which, in addition to containing one saturated fatty acid, also contain two unsaturated fatty acids in the glyceride molecule, these latter being partially in the trans-form. Hence the glycerides have low melting points and a high solubility in oil, and, on cooling, the corresponding hardened products separate out in the form of solids which form gels and are therefore very difficult to separate off.

The use of catalysts containing copper, which have a high selectivity $S_{32} = 8-14$, for the selective hardening of fat has also been proposed (see, for example, DOS/No. 1,467,535 and DOS [Deutsche Offenlegungsschrift]No. 1,467,539) but the complete removal of the copper residues which remain in the hardened products presents considerable difficulties. Because of the known oxidation-promoting properties of copper, and for reasons concerned with foodstuff legislation, the residual copper content must be less than 0.1 mg per kg of hardened product. For this purpose, a repeated wash with mineral acids and with ethylenediaminetetraacetic acid or its disodium salt during the subsequent refining has been proposed, but this requires additional technical equipment and results in the need to install special production lines, because, in addition to copper contact catalysts, nickel contact catalysts are, of course, also used.

Plastic fats, inter alia hardened soya fat are usually employed for baking, cooking, roasting and deep-frying. The stability of these fats, especially under the fairly demanding working conditions of deep-frying, is admittedly very good, but their handling in comparison to liquid oils naturally leads to difficulties especially in commercial establishments. To eliminate these, suspensions of solid glycerides in liquid glycerides, consisting of 1 to 20% of fully saturated triglycerides in oils, have been proposed (see, for example, German Pat. No. 1,045,218). It is true that if the method of manufacture is suitable, stable suspensions which flow in the temperature range of 16° to 38°C can be obtained, cottonseed oil and groundnut oil being usable as particularly suitable carrier oils because (with a view to their end use) they are very stable to oxidation. However, the addition of fully saturated glycerides is superfluous with these two oils because their stability and usefulness are adequate without the addition. More highly unsaturated oils must, according to this proposal, be partially hardened, for example soya oil to an iodine number of about 100, since the carrier oils to be used must contain only a very small amount of glycerides with melting points above 16°C. This again can only be achieved if carefully controlled working conditions are observed, and with the aid of catalysts containing copper, which are, as mentioned above, difficult to remove. Furthermore, the temperature range of 16° to 38°C indicated in the known process is inadequate, because it must be assumed that under practical conditions (storage under cool conditions) the material may assume a lower temperature, down to about 5°C. About this temperature range however, these products change into gel-like compositions which no longer flow.

Fat mixtures intended for the manufacture of margarine must fulfil various requirements. The margarine obtained should retain its structure and be capable of prolonged storage without change in flavour, should be easily spreadable on storage both at refrigerator temperature and at ordinary temperature, should melt easily in the mouth, and should, at the same time, so far as possible produce a cool flavour. Additionally, it should be capable of manufacture without difficulty in continuous operation and be capable of packaging in various ways, namely both in containers and in wrapping paper. Ordinary household margarines always contain some vegetable oils and their storability depends substantially on the nature of the oil used. Particularly good results are obtained with those which are free of linolenic acid, such as sunflower oil, groundnut oil, cottonseed oil and safflower oil. Soya oil, on the other hand, has a harmful effect in that it shortens the storability. Carefully chosen melting temperatures and a cool flavour can, as rule, only be ensured if the fat mixture on which the particular margarine is based does not contain any fully saturated, high-melting triglycerides of fatty acids with 16 carbon atoms or more. It has been proposed, for example in DAS (Deutsche Auslegeschrift) No. 1,240,724, first to remove from the fats to be used, such as palm oil, lard and hardened fats, the fully saturated triglycerides contained therein by means of fractional crystallisation, and then to use the part which remains as the component for margarine fats. The spreadability demanded depends on the ratio of the solid to the liquid constituents of the particular margarine fat as a function of the temperature, in particular in the temperature range of about 5° – 25°C. A suitable measure of this ratio is the dilatation (melt expansion), which is usually specified in the form of a temperature-dilatation diagram or in dilatation values for the particular temperature ($D_t$). Margarine fats can, depending on the end use and on the desired properties of the margarine, be characterised approximately by the following dilatation ranges:

| Dilatation ($D_t$) in mm³/25 g | $D_5$ | $D_{10}$ | $D_{15}$ | $D_{20}$ | $D_{25}$ | $D_{30}$ |
|---|---|---|---|---|---|---|
| Packaged in wrappers, spreadable at 12–28°C | 800–1000 | 750–900 | 500–750 | 250–450 | 100–250 | 50–150 |
| Packaged in containers, spreadable at 3–25°C | 500–750 | 450–600 | 400–500 | 300–400 | 150–200 | 50–100 |

Varieties of margarine which are intended for packaging in wrappers are usually based on fat mixtures consisting of natural solid fats, such as coconut oil, palm kernel oil and palm oil, of hardened fats and of vegetable oils. The requisite stability of structure, especially the non-separation of oils, and of not becoming pasty, as well as delicate melting and cool flavour, can be achieved by careful compounding from the components indicated, if necessary with the pre-treatent which has been mentioned.

To manufacture varieties of margarine which are still easily spreadable at refrigerator temperatures (3°–5°C), mixtures of fats and oils are usually employed which are wholly, or usually only partly, randomly trans-esterified (randomised). Trans-esterified mixtures of palm oil, high-melting palm oil constituents (palm oil stearin) and hardened fats, with varying proportions of coconut oil or palm kernel oil, have been used for some time as constituents of margarine fats. Margarines manufactured in this way also do not give rise to oil separation and also do not become pasaty, this being a phenomenon which depends on crystal transformations which take place during storage; it occurs readily in types of margarine of the first-mentioned variety if the fat mixtures on which they are based are not of the correct composition. Instead of coconut oil and palm kernel oil, other liquid vegetable oils can also be used. Soya oil, admittedly, is unsuitable because the keeping qualities and flavour stability of the corresponding margarines are unflavourably affected, for the reasons explained. According to DAS No. 1,299,992, the manufacture of a margarine fat can also be performed using a single vegetable oil, namely sunflower oil, by randon trans-esterification of hardened sunflower oils of varying hydrogenation with liquid sunflower oil and mixing this trans-esterification product with further liquid sunflower oil and, if appropriate, also with further hardened sunflower oil. If the degree of hardness and the mixing ratios both of the trans-esterified part and of the total mixture are suitably chosen, a margarine can be obtained which is easily spreadable at refrigerator temperatures, does not cause oil separation, and does not become pasty. Whilst, on replacing the sunflower oil by soya oil, these last-mentioned properties are not affected, the flavour stability and the storability of the margarine are considerably worsened.

The purpose of the present invention is to reduce or eliminate these defects and disadvantages and to manufacture products from soya oil by partial hardening with the aid of highly active nickel contact catalysts in combination with further process steps, these products being either in the form of an oil which is liquid down to about 0°C. or of a suspension which flows in the range of 5° to 30°C. or of a margarine fat, which products are distinguished by good stability and correspondingly good utility.

According to the present invention, there is provided a process for the manufacture of at least one of (i) edible, liquid, cold-stable glycerides, (ii) edible, flowable suspensions of solid glycerides in liquid glycerides, and (iii) mixtures of liquid and solid glycerides, which mixtures are suitable for the manufacture or margarine, which process comprises a. hydrogenating soya oil with a nickel contact catalyst, at 110° to 150°C., to an iodine number of 90 to 115, preferably 95 to 110, b. subjecting the hydrogenated soya oil to controlled trans-esterification with a trans-esterification catalyst at 25°C to 30°C. to produce higher-melting triglycerides, and c. fractionating the material from step (b) by slowly cooling it to a temperature of 0° to 10°C., preferably to 3° to 7°C., and keeping it for at least 2 hours at this temperature, and then separating the solid constituents and recovering the liquid cold-stable constituents (i), and, optionally, d. mixing the material from step (b) in about equal parts with the cold-stable oil obtained from step (c) and then cooling the mixture to a temperature of 10° to 18°C., so that the high-melting glycerides crystallise out almost completely, and then keeping the mixture at a temperature of about 25°C. until the solid constituents have been converted into the stable crystal form ($\beta'$-modification or $\beta$-modification) and then cooling to produce edible, flowable suspensions (ii) of solid glycerides in liquid and/or, optionally, glycerides e. combining material from step (b) with solid constituents obtained from step (c) to produce glyceride mixtures (iii) suitable for the manufacture of margarine.

The essential features of the invention are accordingly a combination of known process steps, with the exact observance of certain process conditions. In the first process step, step (a), previously refined soya oil is hydrogenated with a nickel contact catalyst, suitably freshly produced, at 110° to 150°C. to iodine numbers of 90 to 115, preferably 95 to 110. This makes it possible, on the one hand, to reduce the proportion of linolenic acid to below 20% of the original value, usually to below 2% in the hardened product, and, on the other hand, to keep the content of trans-double bonds very low, and in particular below 20%, usually at 10 to 15%, of the remaining double bonds. Of this total proportion of trans-double bonds, about two-thirds are attributable to monoene-fatty acid radicals, that is to say elaidic acid and positionally isomeric monoene-acid radicals, and one-third to diene-fatty acid radicals. Since these, like the saturated fatty acid radicals present, are in the form of mixed-acid triglycerides, predominantly monosaturated-diunsaturated, which in the pure form melt in low temperature ranges (about 15° to 35°C) and are additionally relatively easily soluble in oil, the corresponding hardened product shows an unfavourable melting temperature and crystallisation behaviour; its clear melting point is at about 6° to 10°C, and, on slow cooling, proportions of solid glycerides increasingly separate out, until finally, at about 5°C, the entire mass assumes a solid, gel-like form. The same effect is also observed on shock cooling to 5° – 10°C. Since the state of aggregation of such products changes considerably with slight fluctuations in temperature, such as occur on customary storage, in particular changes from the solid state via a semi-liquid state, with a supernatent oil component which has separated out, to the completely liquid state, such products can neither be employed as flowable fat suspensions nor are they suitable for fractional crystallisation to separate off a permanently liquid oil; the latter is particularly so because the solid components produced on cooling separate out in a form which is extremely difficult, and frequently impossible, to separate off, nor are they suitable for the manufacture of margarine. The nickel catalyst can also comprise 20 to 25 parts by weight of nickel and 75 to 80 parts by weight of $\gamma$-aluminum oxide.

This disadvantage is removed by the second process step (step (b)) in that the hardened product is subjected to a controlled trans-esterification with the aid of a highly active catalyst. By "controlled transesterification" is meant a method of treatment in which the liquid fats are first treated with amounts generally about 0.02 to 0.2%, of a trans-esterification catalyst, such as an alkali metal alcoholate in powder form or an alkali metal in suspension, and are then gradually cooled, with stirring. By this means, the saturated fatty acid radicals of the fat are progressively converted into high-melting, in part completely saturated and in part mono-unsaturated-disaturated triglycerides, which separate out almost completely if the temperature of the process is correctly controlled. Trans-monoene-fatty acid radicals which may be present also form, together with saturated fatty acid radicals, high-melting triglycerides which also separate out under the conditions mentioned. If such partially hardened soya oil is subjected to the controlled trans-esterification by very gradually cooling it in the liquid state (at about 40°C), together with, for example, 0.05 to 0.1% of pulverulent sodium methylate or 0.03 to 0.05 % of metallic sodium as suspension, to about 25°C with constant stirring, the first constituents begin to separate out at about 30°C and at 25°C the desired conversion and separation are substantially complete. During the cooling process care must, of course, constantly be taken to ensure that sufficient transesterification catalyst is present in the active form; this can, if necessary, readily be achieved by subsequent addition of small portions of sodium methylate or sodium metal. After completion of the process the catalyst can be inactivated by adding water and the material can now be processed further. It may be fused, washed and treated with fuller's earth. Saturated fatty acid radicals and trans-monoene-fatty acid radicals are now present in the form of high-melting triglycerides which are monounsaturated-disaturated, whilst practically no fully saturated triglycerides remain.

The remaining process step (or steps) employed depends on the nature of the end product to be manufactured. If a cold-stable oil (i) is to be produced, the material is gradually cooled (step (c)), for example for 2 to 20 hours, until all crystallisable constituents have separated out. This is usually the case at 5° to 7°C. The solid constituents which separate out consist of coarse crystals and can easily be separated off, for example with the aid of a filter press. Surprisingly, the yield of cold-stable oil is very high and may be 80 to 85%, whilst in the known process, apart from the extreme difficulties of separation which have been described, only at most 70% of oil can be obtained. The solid constituents generally show capillary melting points of 32° to 40°C. In order to make both constituents suitable for consumption, they should be deodorised in the usual manner.

If it is desired to produce a flowable suspension, (ii) the material which has been hardened, subjected to a controlled trans-esterification and deodorised, is first mixed with the cold-stable oil in such a ratio that the mixture shows the following dilatation values ($D_t$ in mm$^3$/25 g): $D_5$ 280–300, $D_{10}$ 180–250, $D_{15}$ 120–160, $D_{20}$ 80–100, $D_{25}$ 40–60. This is usually achieved with a mixing ratio of about 1 : 1. The mixture is then cooled, for example, on known continuously operating cooling devices, to about 10° to 18°C, then brought to about 25°C in containers equipped with stirrers, and kept at this temperature until the crystalline constituents which first separate out as unstable modifications have practically completely changed to the stable $\beta'$- or $\beta$-modification. Usually, several hours are required for this temperature treatment. The temperature-treated material may now be cooled to 16° – 18°C by means of a continuously operating cooling device and is then ready to use. It is a milky white suspension which still flows completely at 5°C, does not separate out oil even on prolonged storage, even if the temperature is increased to about 25°C, and if the storage temperature drops becomes somewhat more viscous without, however, separating out oil.

The material which has been hardened, subjected to a controlled trans-esterification and deodorised is suitable for the manufacture of an easily spreadable margarine. Its consistency can easily be increased by mixing the above-mentioned solid constituents into the starting fat obtained from step (b). As a rule it generally suffices to employ up to about 20 parts by weight of these solid constituents per 100 parts by weight of the starting fat. The solid constituents which have separated out can also be used by themselves for the manufacture of margarine for baking purposes or for similar special margarines.

The combination of process steps according to this invention, namely partial hardening, followed by controlled trans-esterification and subsequent fractional crystallisaation with separation of the solid from the liquid constituents or production of a suspension of solid in liquid glycerides or of a mixture of liquid and solid glycerides suitable for the manufacture of margarine can also be applied to mixtures containing soya oil with other vegetable oils, for example to mixtures with sunflower oil, cottonseed oil, groundnut oil or corn oil.

The oil manufactured according to the process of the invention is cold-stable, that is to say virtually no solid constituents separate out after 17 hours' storage at 0°C, and is distinguished by high stability to oxidation, equalling the stability of cottonseed oil and groundnut oil. Unlike soya oil, the oil no longer has a tendency to flavour reversion and can therefore be used as a high quality salad oil or for the manufacture of mayonnaise. This is also true of the suspensions manufactured according to the invention, which are suitable for baking, roasting, cooking and deep-frying. Used as a deep-frying fat, the products, if properly used, stand comparison with the deep-frying fats hitherto used, such as palm oil, hardened vegetable fats, and groundnut oil in particular as regards changes in colour, the smoke point and the content of hydroxy-fatty acids. The flow, which is present over the unusually broad temperature range of 5° to 25°C, ensures that the product of this invention is particularly easy to handle.

Margarines manufactured from the hydrogenated soya oil, subjected to controlled trans-esterification, which has been manufactured according to this invention, optionally with the addition of the solid constituents mentioned, are especially distinguished, apart from the properties already mentioned, by the fact that for up to 3 months' storage they suffer no loss in odour and flavour. Their structural stability is also practically unchanged during the entire storage time. In accordance with standard nomenclature parts and percentages are expressed by weight.

The following Example further illustrates the present invention. The dilatation values were determined according to the DGF standard method C - IV 3e (57).

EXAMPLE:

32 tons of pre-refined soya oil (iodine number 132.5; 0.06% of free fatty acids) were heated to 110°C in a stirred ordinary steel autoclave, under a vacuum of 20 mm mercury. 60 kg of a freshly manufactured nickel contact catalyst (Ni content 25%; carrier: γ-aluminum oxide) in the form of a suspension in 500 litres of pre-refined soya oil were then drawn in and immediately hydrogen was fed in untill the hydrogen pressure in the autoclave was 3 kg/cm². On the further introduction of hydrogen pre-compressed to 4 kg/cm² the hydrogenation started immediately, recognisable by the increase in temperature of the autoclave contents to 115°C within 5 minutes. Cooling water was now pumped round, the cooling being regulated in such a way that the hydrogenation temperature was 130° to 135°C during the remainder of the process. Samples were continually withdrawn at intervals of 5 minutes and examined for their refractive index. After a total of 40 minutes' hydrogenation, the refractive index $n_D^{50}$ of 1.4604, corresponding to an iodine number of 103, was reached, after which the hydrogenation was stopped. The properties and composition of the total fatty acids in the starting material and in the hardened product are compared below.

|  | Starting material | Hardened product |
| --- | --- | --- |
| palmitic acid (%) | 10.6 | 10.6 |
| stearic acid (%) | 4.6 | 4.6 |
| octadecaenoic acid (%) | 21.3 | 52.3 |
| oleic acid (%) | 21.3 | 40.1 |
| claidic acid and isomers (%) | — | 12.2 |
| octadecadienoic acid (%) | 55.3 | 30.9 |
| linoleic acid (%) | 55.3 | 26.5 |
| isomers (%) | — | 4.4 |
| octadecatrienoic acid (%) (linolenic acid) | 8.2 | 1.6 |
| conjugated fatty acids (%) | 0.1 | 0.1 |

The capillary melting point was 7°C.

The dilatation ($D_t$ in mm³/25 g) has the following values:

| | |
| --- | --- |
| $D_5$ | 230 |
| $D_{10}$ | 175 |
| $D_{15}$ | 120 |
| $D_{20}$ | 70 |
| $D_{25}$ | 30 |
| $D_{30}$ | 0 |

The post-refined hardened product (0.05% of free fatty acids) was divided into two portions and each transferred into a 15 ton trans-esterification vessel, dried for 1 hour at 140°C at 20 mm mercury, and then cooled to 30°C. 10 kg of pulverulent sodium methylate were introduced into one container, whilst stirring, whilst 5 kg of metallic sodium in the form of a suspension in toluene were introduced into the other. Thereafter the contents of the containers were gradually cooled to 25°C in vacuo and kept at this temperature for 3 hours. The same amounts of catalyst were then again added to each container and the temperature (25°C) was maintained for a further 5 hours. The initially slightly cloudy reaction mixture of both batches had now assumed a milky appearance as a result of solid constituents separating out. The degree of trans-esterification was measured dilatometrically and was found to be the same in both batches. After inactivation of the catalysts by adding 200 litres of water in each case, the two batches were combined, copiously washed with water, dried, treated with one-half % of activated fuller's earth and deodorised.

The material treated in this way now showed the following properties and characteristic data:

Capillary melting point 32.5°C
Dilatation ($D_t$ in mm³/25 g)

| | |
| --- | --- |
| $D_3$ | 470 |
| $D_{10}$ | 420 |
| $D_{15}$ | 360 |
| $D_{20}$ | 260 |

-Continued

| | |
|---|---|
| $D_{25}$ | 180 |
| $D_{30}$ | 100 |
| $D_{35}$ | 30 |

20 tons of the material which has been hardened, subjected to controlled trans-esterification and post-refined were cooled to 6°C over 48 hours in a closed vessel, with the stirrer running slowly, and kept at this temperature for a further 24 hours. The solid constituents separated out in a coarsely crystalline form and were separated off on filter presses. The yield of oil was 82%. After storing the latter for 17 hours, no solid constituents had separated out. The isolated solid constituents showed a capillary melting point of 35.2°C.

5 tons of the remaining product were mixed with 5 tons of the cold-stable oil previously obtained. The mixture showed the following dilatation values ($D_t$ in mm³/25 g):

| | |
|---|---|
| $D_5$ | 250 |
| $D_{10}$ | 200 |
| $D_{15}$ | 130 |
| $D_{20}$ | 80 |
| $D_{25}$ | 50 |
| $D_{30}$ | 15 |

The material was cooled to 16°C with the aid of a continuously operating cooling device and was transferred into a vessel equipped with a stirrer. The temperature rose to 24°C over one hour and was then raised to 25° to 26°C by heating. The material was left at this temperature for 12 hours and then cooled to 18°C by means of a continuously operating cooling device. The product had a milky appearance and, after storage at various temperatures (at 5°C, 15°C and 25°C), was uniformly capable of flow without oil separating out.

To examine its utility, the suspension was compared to refined palm oil and refined hardened soya oil (degree of hardening 34°/36°C) for use as a deep-frying fat. After 60 hours' use at the same deep-frying temperature (180°C) and with the same material introduced (Potato chips), the fats showed the following properties:

| | Product according to the invention | Palm oil | Refined hardened soya oil, 34/36°C |
|---|---|---|---|
| smoke point in °C | 178 | 175 | 174 |
| colour, Lovibond, 5¼" | 7.5 red<br>75 | 8.0 red<br>80 yellow | 7.7 red<br>75 yellow |
| % hydroxy-fatty acids (according to DGF standard method) the initial values of all the products were: | 0.75 | 0.80 | 0.76 |
| smoke point in °C | 225 – 230 | | |
| colour, 5¼" | 1 – 1.5 red<br>10 – 15 yellow | | |
| % hydroxy-fatty acids | <0.1% | | |

The stability and utililty of the product according to the invention are accordingly roughly equal to those of proven deep-frying fats.

A further 5 tons of the remaining product were mixed with 1 ton of the solid constituents obtained during the fractional crystallisation. The mixture showed a capillary melting point of 32.8°C and the following dilatation values ($D_t$ mm³/25 g):

| | |
|---|---|
| $D_5$ | 580 |
| $D_{10}$ | 520 |
| $D_{15}$ | 440 |
| $D_{20}$ | 320 |
| $D_{30}$ | 90 |
| $D_{35}$ | 15 |

A margarine was manufactured therefrom in the usual manner and packaged in cups. It was easily spreadable even at refrigerator temperature, and showed delicate melting and a cool flavour. After three months' storage, neither structural changes (separation of oil, or becoming pasty) nor deteriorations in odour and flavour were detectable.

What we claim is:

1. A process for the manufacture of at least one of (ii) edible, flowable suspensions of solid glycerides in liquid glycerides, and (iii) mixtures of liquid and solid glycerides, which mixtures are suitable for the manufacture of margarine, which process comprises:

1a. hydrogenating soya oil with a nickel contact catalyst, at 110° to 150° C., to an iodine number of 90 to 115;

b. subjecting the hydrogenated soya oil to controlled trans-esterification with a trans-esterification catalyst at 25° to 30° C., to produce higher-melting triglycerides; and c. fractionating the material from step (b) by slowing cooling it to a temperature of 0° to 10° C. and keeping it for at least 2 hours at this temperature, and then separating the solid constituents and recovering the liquid, cold-stable constituents (i); and d. mixing the material from step (b) in about equal proportions by weight with the cold-stable oil obtained from step (c) and then cooling the mixture to a temperature of 10° to 18° C., so that the high-melting triglycerides crystallize out almost completely, and then keeping the mixture at a temperature of about 25° C. until the solid constituents have been converted into the stable crystal form, said crystal form being the $\beta'$-modification or $\beta$-modification and then cooling to produce edible, flowable suspensions, (ii) of solid glycerides in liquid glycerides; or 2a. hydrogenating soya oil with a nickel contact catalyst, at 110° to 150° C., to an iodine number of 90 to 115;

b. subjecting the hydrogenated soya oil to controlled trans-esterification with a trans-esterifications catalyst at 25° to 30° C., to produce higher-melting triglycerides; and c. fractionating the material from step (b) by slowing cooling it to a temperature of 0° to 10° C. and keeping it for at least 2 hours at this temperature, and then separating the solid constituents and recovering the liquid, cold-stable constituents (i); and e. combining material from step (b) with solid constituents obtained from step (c) to produce glyceride mixtures (iii) suitable for the manufacture of margarine.

2. A process according to claim 1 comprsing steps (a), (b), (c) and (d).

3. A process according to claim 1 comprising steps (a), (b), (c) and (e).

4. A process according to claim 1 in which, in step (a), the oil is hydrogenated to an iodine number of 95 to 110.

5. A process according to claim 1 in which, step (c), the material from step (b) is cooled to a temperature from 3° to 7°C.

6. A process according to claim 1 in which, in step (b), the trans-esterification catalyst is an alkali metal alcoholate or alkali metal, in an amount from 0.02 to 0.2% by weight.

7. A process according to claim 6 in which the catalyst comprises 0.05 to 0.1% by weight of pulverulent sodium methylate or 0.03 to 0.05% by weight of metallic sodium.

8. A process according to claim 3 in which, in step (e), up to 20 parts by weight of the solid constituents are added per 100 parts by weight of the starting material.

9. A process according to claim 1 in which the soya oil is mixed with sunflower, cottonseed, groundnut or corn oil.

10. A process according to claim 1 in which the nickel catalyst comprises 20 to 25 parts by weight of nickel and 75 to 80 parts by weight of $\gamma$-aluminium oxide.

11. A process according to claim 1 in which at some stage following step (b) the product is deodorised.

12. A product prepared by the process of claim 2.

13. A product prepared by the process of claim 3.

* * * * *